United States Patent
Duron et al.

(12) United States Patent (10) Patent No.: US 7,091,859 B2
(45) Date of Patent: Aug. 15, 2006

(54) PACKAGE-INTEGRATED RF RELAY

(75) Inventors: Mark Duron, East Patchogue, NY (US); Raj Bridgelall, Mount Sinai, NY (US); Avi Nudelman, Dix Hills, NY (US); Hal Charych, East Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 110 days.

(21) Appl. No.: 10/341,849

(22) Filed: Jan. 13, 2003

(65) Prior Publication Data

US 2004/0135691 A1 Jul. 15, 2004

(51) Int. Cl.
*G08B 13/14* (2006.01)

(52) U.S. Cl. .............................. 340/572.1; 340/572.7; 235/435; 343/703

(58) Field of Classification Search .. 340/572.1–572.8; 343/703, 788; 235/435
See application file for complete search history.

(56) References Cited

U.S. PATENT DOCUMENTS

| | | | | |
|---|---|---|---|---|
| 4,107,609 A | * | 8/1978 | Gruenberg | .................. 455/16 |
| 4,468,669 A | * | 8/1984 | Wang et al. | ................ 343/703 |
| 6,107,920 A | * | 8/2000 | Eberhardt et al. | ....... 340/572.7 |
| 6,259,369 B1 | * | 7/2001 | Monico | .................. 340/527.8 |
| 6,340,932 B1 | * | 1/2002 | Rodgers et al. | .......... 340/572.7 |
| 6,384,727 B1 | * | 5/2002 | Diprizio et al. | .......... 340/572.7 |

* cited by examiner

*Primary Examiner*—Phung T. Nguyen
(74) *Attorney, Agent, or Firm*—Ingrassia Fisher & Lorenz

(57) ABSTRACT

Containers for holding goods are provided with a relay conductive structure for relaying RFID tags signals from one side of the container to another. The conductive structure includes a first antenna on the first side of the container, a second antenna on a second side of the container and a transmission line connecting the antennas. When the containers are arranged in a stack, the relay of RFID signals past each row of containers enables the interrogation toward the rear of the stack without disassembling the stack of containers.

20 Claims, 6 Drawing Sheets

PACKAGE-INTEGRATED RF RELAY

BACKGROUND OF THE INVENTION

This invention relates to RFID tags for use in identifying packages and the contents thereof. It is currently known to use RFID tags for purposes of identifying packages, containers, and the like. Such identification TAGS can provide the user of an RFID reading device with data which can be correlated to information about the contents of a container. The information may be stored in digital form as part of the RFID response code, or alternately may be maintained in a computer database with a correlation to the RFID identification sent by the tag in response to an interrogation signal. FIG. 1 shows an arrangement of containers 20 having RFID tags 22. The stack of containers 20 may be arranged, for example, in a warehouse or on a pallet for shipment. In connection with identifying the content of the containers or locating a particular container, it is possible to use an RFID interrogator to interrogate the tags 22 on the face layer of boxes 20. However, depending on the contents of the boxes and the number of layers of boxes in the stack, no assurance can be given concerning the interrogation of tags at the center or rear of the stack.

It is an object of the present invention to provide packaging containers which enable an RFID signal to penetrate a stack of containers so that containers located at the center or rear of the stack can be interrogated without moving the containers arranged in the front of the stack.

SUMMARY OF THE INVENTION

In accordance with the present invention, there is provided an improvement in packaging for goods where goods are arranged in containers having RFID tags. The improvement includes a first antenna on a first side of a container for receiving RFID signals, a second antenna on a second side of the container for radiating RFID signals and a transmission line interconnecting the first and second antennas.

In a preferred arrangement, the second side of the container is opposite to the first side. The transmission line may be formed of conductors printed on the container, co-planar twisted pair, or an insert, including dividers of the container. The antennas may also comprise conductors printed on the container or on an insert in the container. The container may include for example, four walls with two of the first antennas, one on each of adjacent front and side walls and two of the second antennas on adjacent rear and opposite side walls. Transmission lines interconnect the antennas on the front and rear walls and the antennas on the side and opposite side walls. An RFID tag may be coupled to either the antennas or the transmission line. The transmission line and antennas from a conductive structure that may be tuned to a frequency corresponding to the frequency of the RFID signals. A tuning structure may be provided for tuning the conductive structure. In one arrangement, the transmission line is a twisted pair transmission line. The antennas may also be formed using twisted pair transmission lines.

In accordance with the invention, there is provided a method for interrogating RFID tags provided on containers arranged in a stack. The containers are provided with conductive structures arranged to couple RFID signals from a first side of each of the containers to a second side of the containers. An RFID interrogation signal is radiated toward the stack and coupled to RFID containers within the stack using the conductive structure on the containers. RFID response signals are coupled from RFID tags on containers, within the stack to the exterior of the stack using the conductive structures on the containers and the RFID response signals are received.

In accordance with the invention, there is provided a container having sides arranged horizontally around goods. Antennas are arranged on the sides of the container for radiating and receiving REID signals in different horizontal directions from the container and a transmission line is provided interconnecting the antennas.

The horizontal directions are preferably opposite directions from the container. The sides may be fabricated from dialectric material and the antennas and transmission lines can be printed on the material. The material can be any non-conductive substrate such as plastic or fiber board. In one arrangement, the antennas and transmission line are fabricated from twisted pair transmission line. The antennas may be folded dipoles formed of twisted pair transmission line. In one arrangement the container can be formed of plastic material having dual walls and reinforcing ribs between the walls, and the transmission line can be arranged between the walls and/or molded within the walls or ribs.

For a better understanding of the present invention, together with other and further objects, reference is made to the following description. Taken in conjunction with the accompanying drawings, and it's scope will be pointed out in the appended claims.

DESCRIPTION OF INVENTION

Figure 1:
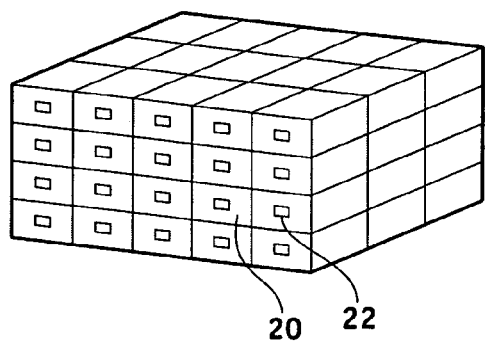
FIG. 1 illustrates a stack of containers having RFID tags in accordance with the prior art.
Figure 2:
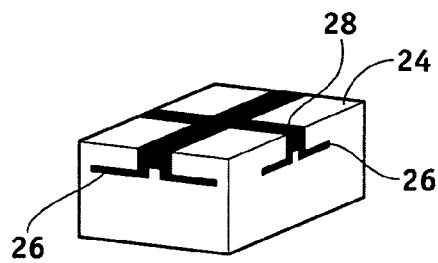
FIG. 2 is an illustration of a first embodiment of a container having RFID conductive relay structures in accordance with the present invention.
Figure 3:
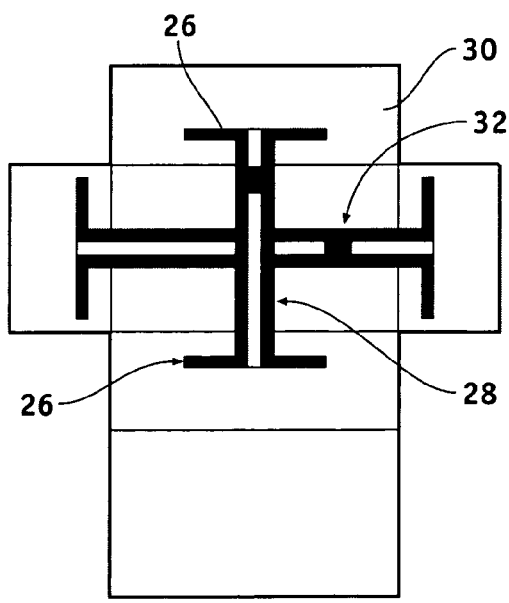
FIG. 3 is an illustration of the container of FIG. 2 prior to folding.

Referring to FIG. 2, there is schematically illustrated a container 24 having conductive relay structure for relaying RFID signals according to the invention. The container of FIG. 2 is fabricated by folding fiber board parts from a blank 30 shown in FIG. 3. The structure includes printed conductive members forming a relay structure which includes antennas 26 arranged on the side walls of container 24 in the assembled condition and transmission lines 28 interconnecting antennas 26 on opposite sides of the container. In the embodiment illustrated in FIGS. 2 and 3, the conductive structures, comprising dipoles and balanced transmission lines are printed on the container, which may be fiberboard, for example, or on an insert placed within the container. RFID tags 32 are arranged to receive signals and are connected either to the transmission line 28 or alternately to one of the dipole antennas 26.

Figure 4:
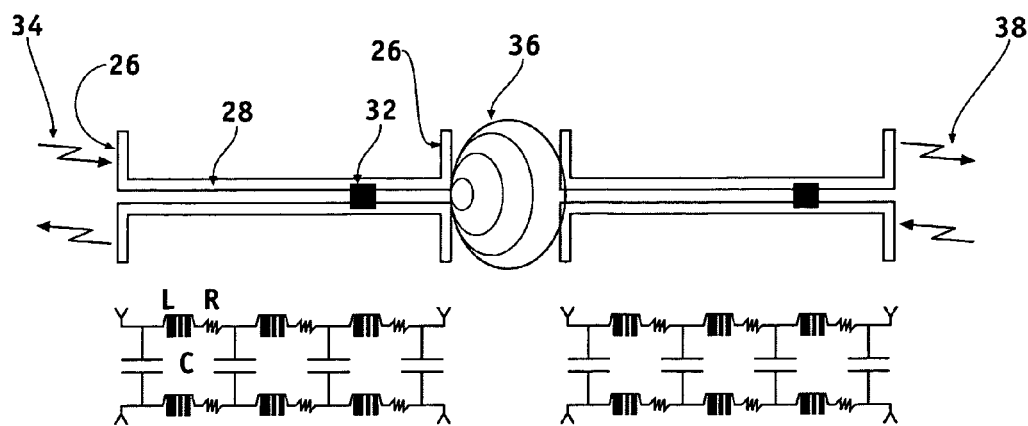
FIG. 4 is a diagram illustrating the operation of the RF conductive structure on the container of FIG. 2 for relaying RFID signals, and its equivalent circuit.

Referring to FIG. 4, the operation of the present invention is illustrated in a diagram showing only the conductive structures added to the container according to the present invention. Signals 34 are received by antenna 26 and brought by transmission line 28 to an RFID tag 32 and another antennas 26 on the opposite side of a container. Signals are re-radiated from antenna 26, preferably as near field signals 36 and may thereafter be received by an antenna 26 on a second container in close proximity to the first container. The signals are likewise relayed through the second container and radiate as signals 38 out the rear thereof. In this manner, RFID interrogation signals or RFID response signals may be relayed through or from containers located within a stack of containers with minimized interference from the containers or the goods contained therein. For example, the containers may include metallic cans or plastic containers filled with beverages, either of which would either reflect, absorb or otherwise interact with signals in the UHF or microwave band which are used for RFID tag interrogation and RFID response signals. FIG. 4 further illustrates the equivalent circuit for the conductive structures.

Figure 5:
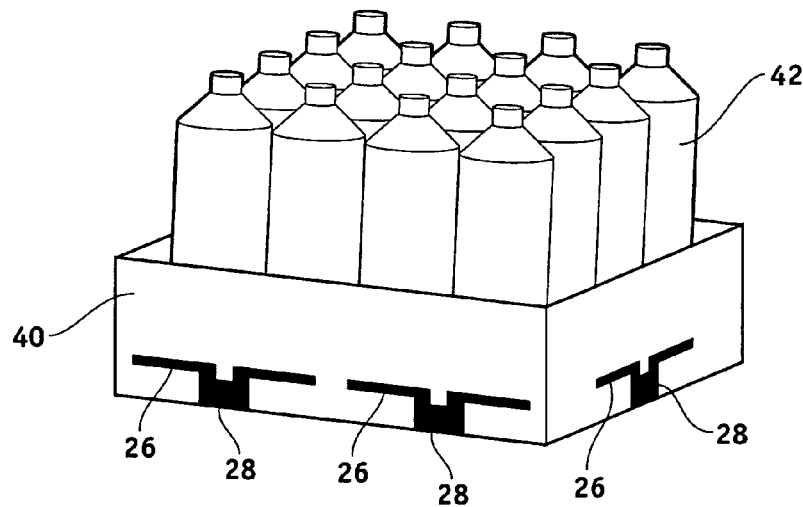
FIG. 5 is an illustration of a container in accordance with the present invention for holding beverage bottles.
Figure 6:
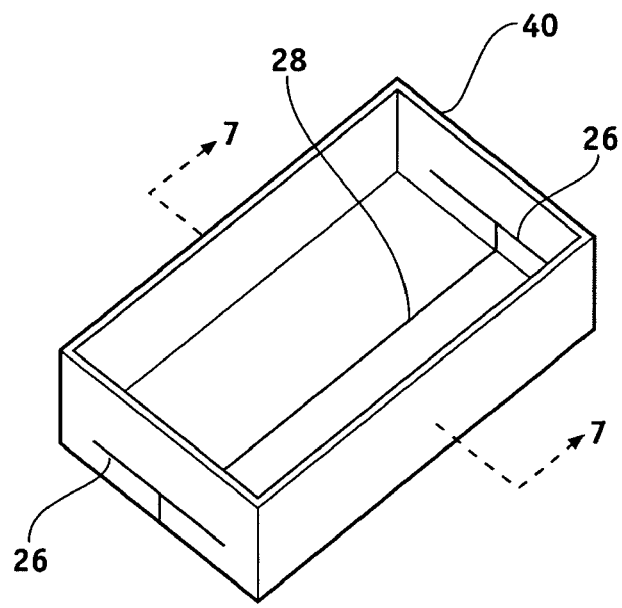
FIG. 6 is a simplified prospective view of the container of FIG. 5 without the beverage bottles.
Figure 7:
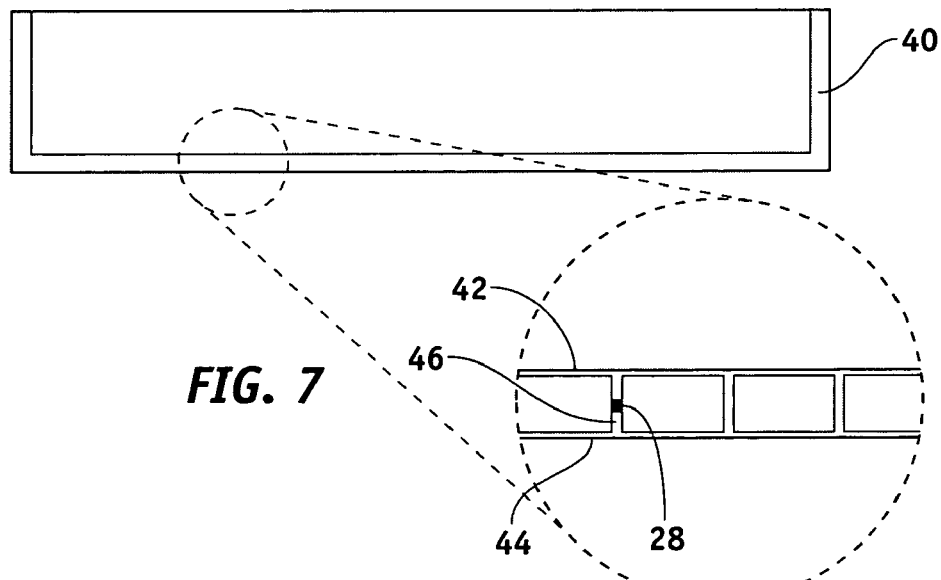
FIG. 7 is a cross-sectional view of the container of FIG. 5.

Referring to FIG. 5 there is shown a container 40, which may be re-useable, for holding bottles of beverages 42 and incorporating conductive relay structures according to a second embodiment of the present invention. Container 40 is preferably made of dielectric material, such as plastic, and includes four side walls and a bottom. Antennas 26 are arranged on the side walls and connected to antennas on opposite side walls with transmission lines 28 for relaying RFID tag and RFID response signals to and from containers located within a stack of containers. The structure of container 40 and its RFID relay conductive structure is shown in FIGS. 6 and 7. Antennas 26 as shown in the simplified drawings FIG. 6, are located on opposite side walls of container 40. For simplicity, the drawing of FIG. 6 shows only the antennas 26, on the end side walls.

FIG. 7 is a cross-section of the container of FIG. 6 and includes an enlargement of the bottom wall of the container, illustrating an exemplary arrangement wherein the container wall is made from upper and lower walls 42 and 44 which are interconnected by ribs 46, which are formed of molded plastic. Ribs 46 may run in the longitudinal direction of the container 40 or may be an eggcrate structure, including ribs that run in both directions. In the drawing of FIG. 7 transmission line 28 is shown to be molded within a longitudinal rib 46 of the container 40. Alternately, the transmission line 28 may run in the hollow space between the inner wall 42 and the outer wall 44 of container 40.

Figure 8:
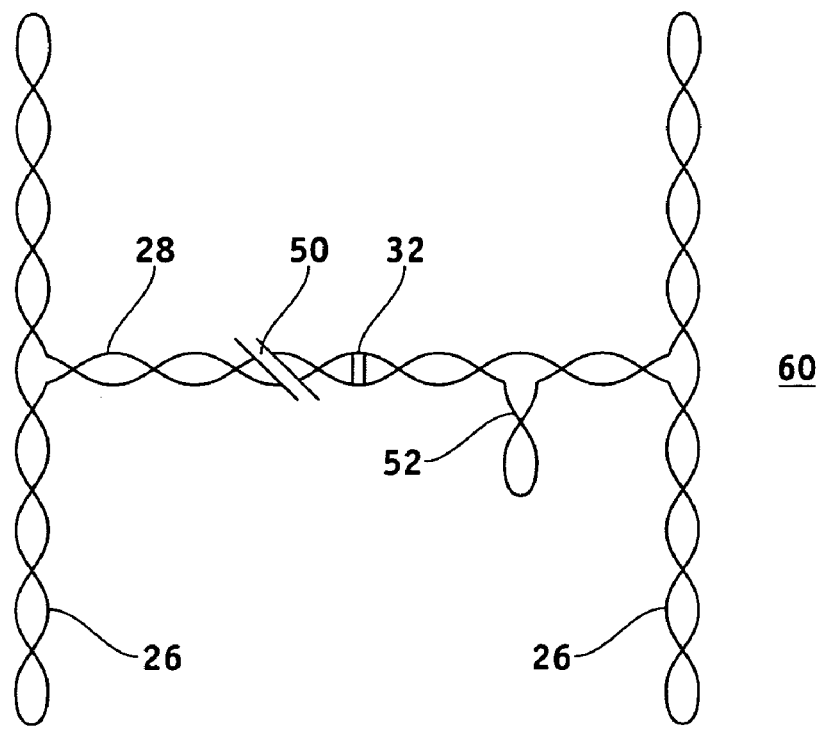
FIG. 8 is an illustration of a conductive relay structure in accordance with one embodiment of the present invention.

FIG. 8 shows an alternate to the printed embodiment for the relay conductive structure according to the invention, wherein the transmission line 28 and dipoles 26 are formed of twisted pair transmission line wire. The length of the transmission line 28 is shown as being adjustable by break 50 such that the transmission line can have length corresponding to the length of the container. In the embodiment shown in FIG. 8, the transmission line is a twisted pair line, having a relatively low loss, and can be made to resonate between the antennas 26 arranged at either end thereof. To achieve the proper resonance with a variable length transmission line 28, a tuning structure 52, which is shown as an extra piece of twisted pair wire connected to the transmission line, may be provided. An RFID tag 32 may be connected directly to the twisted tear as shown in FIG. 8. Preferably, the RFID tag has less than complete coupling of signals from the conductive relay structure, so that signals are relayed from the receiving antenna 26 at one end of the package to be radiated by the antenna 26 at the opposite end of the package. Experimentation has shown that the signal coupled to the RFID tag 32 should be coupled at a level of approximately −7 db.

Figure 9:
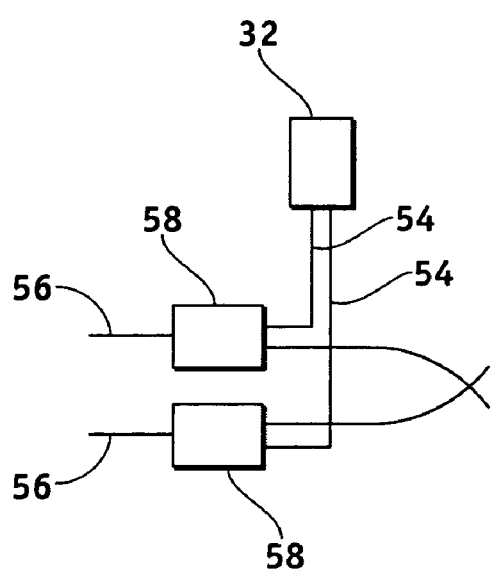
FIG. 9 is a diagram illustrating an exemplary arrangement for connecting an RFID tag to the structure of FIG. 8.

FIG. 9 illustrates an alternate method of attaching an RFID tag to a twin wire transmission line. In the structure shown of FIG. 9, a squeeze-on connector 58 of the type used to connect trailer electrical connections in an automobile is used to provide a quick and convenient connection between leads 54 connected to RFID tag 32 and transmission line wires 56.

Figure 10:
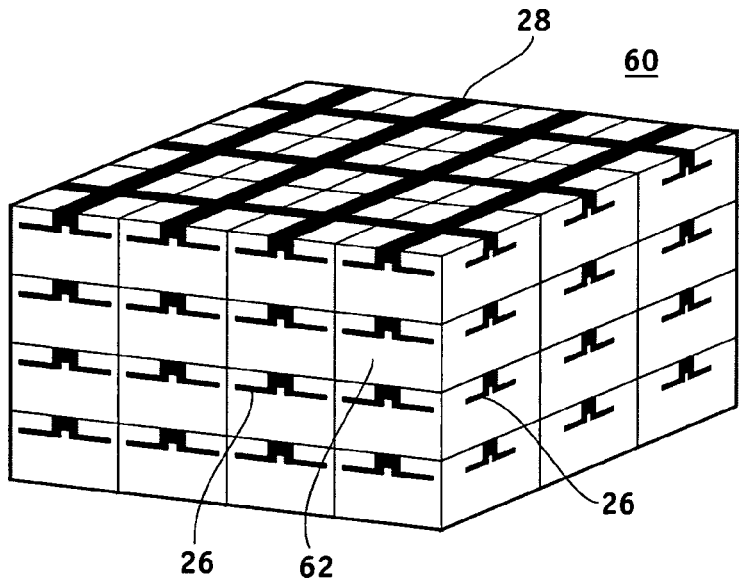
FIG. 10 is an illustration of a stack of containers having conductive relay structure according to the present invention.

FIG. 10 shows an arrangement of containers 62 having antennas 26 on all four side walls and transmission lines 28 interconnecting those antennas. As shown in FIG. 10, signals received by the antennas 26 of the outer containers can be relayed through the stack of containers, for example, a stack of containers on a cargo pallet or in a cargo storage area. Interrogation of the packages within the stack 60 can be made either from the forward facing or side facing walls thereof.

Figure 11:
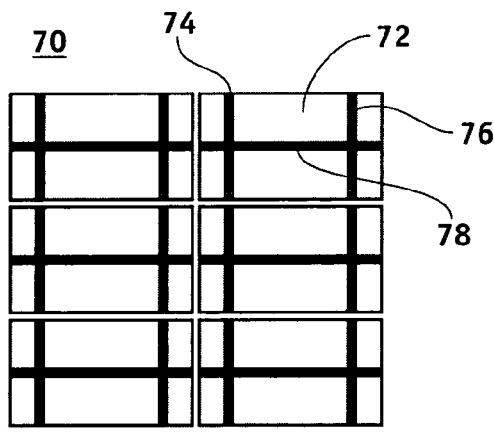
FIG. 11 illustrates a stack of containers having an alternate relay conductive structure according to the invention.
Figure 12:
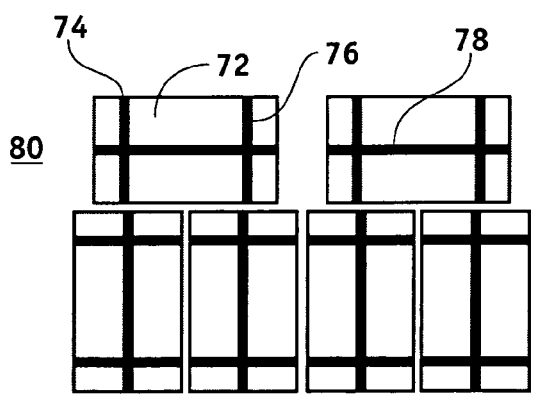
FIG. 12 is a diagram illustrating an alternate stacking arrangement for containers having conductive relay structure according to the FIG. 11 embodiment.

FIGS. 11 and 12 illustrate arrangements 70 of containers 72 which include a single relay conductive structure 78 extending horizontally around the container and a pair of conductive relay structures 74 and 76 extending around the top, bottom and side walls thereof. The containers can be stacked in a symmetrical arrangement as shown in FIG. 11 or in an alternate overlapping stacking arrangement 80 as shown in FIG. 12.

Figure 13:
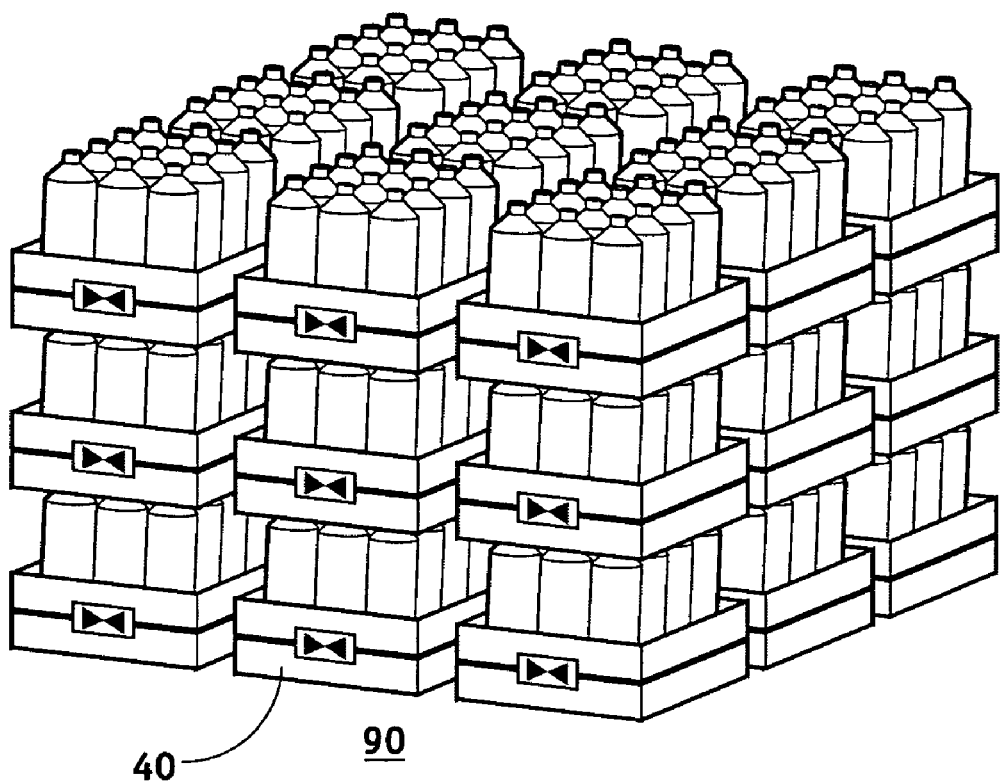
FIG. 13 is an illustration showing a stack of beverage bottle containers having conductive relay structure according to the present invention.

FIG. 13 illustrates an arrangement of beverage containers 40 having beverage bottles therein arranged in a stack 90.

While the examples described use dipole antennas in the conductive structure, those skilled in the art, will recognize that other arrangements, such as loop antennas, spiral antennas and the like may be used. Further the transmission line and antennas may be formed of a common resonant structure acting as both antennas and transmission line.

While there have been described what are believed to be the preferred embodiments of the present invention, those skilled in the art will recognize that other and further changes may be made thereto without departing from the spirit of the invention, and it is intended to claim all such changes and modifications as fall within the true scope of the invention.

We claim:

1. In packaging for goods arranged in containers having RFID tags, a conductive structure comprising:
   a first antenna on a first side of a container for receiving RFID signals,
   a second antenna on a second side of said container for radiating said RFID signals received from said first antenna, and
   a transmission line interconnecting said first and second antennas.

2. The conductive structure of claim 1 wherein said second side of said container is opposite said first side.

3. The conductive structure of claim 1 wherein said conductive structure printed on said container.

4. The conductive structure of claim 1, wherein said conductive structure is an integral conductive structure, wherein said transmission line is integral with said first and second antennas, and wherein said transmission line carries said RFID signals from said first antenna to said second antenna.

5. The conductive structure of claim 1 wherein said container includes four side walls, and wherein there are provided two of said first antennas, one on each of adjacent front and side walls and two of said second antennas on adjacent rear and opposite side walls, and wherein there are provided two of said transmission lines, one interconnecting antennas on said front and rear walls and one interconnecting antennas on side and opposite side walls.

6. The conductive structure of claim 5 wherein there is provided an RFID tag coupled to one of said antennas and said transmission lines.

7. The conductive structure of claim 1 wherein there is provided an RFID tag coupled to one of said antennas and said transmission line.

8. The conductive structure of claim 1 wherein said transmission line is tuned to a frequency corresponding to the operating frequency of said RFID signals.

9. The conductive structure of claim 1 wherein said transmission lines are lossy transmission lines.

10. A method for interrogating RFID tags provided on containers arranged in a stack, comprising:
providing on said containers conductive structures arranged to couple RFID signals from a first side of each of said containers to a second side of said containers;
radiating an RFID interrogation signal toward said stack;
coupling said RFID signals to RFID tags on containers within said stack using said conductive structures on said containers;
coupling RFID response signals from RFID tags on containers within said stack to the exterior of said stack using said conductive structures on said containers; and
receiving said RFID response signals.

11. A container comprising:
sides arranged to horizontally surround goods; and
a conductive structure, comprising:
at least two antennas on said sides, wherein one of said antennas is configured to receive RFID signals and radiate said RFID signals from the container in a first horizontal direction, and wherein another one of said antennas is configured to receive said RFID signals from the one of said antennas and to radiate said RFID signals from said container in a second horizontal direction; and
a transmission line interconnecting said antennas.

12. A container as specified in claim 11 wherein said horizontal directions are opposite directions.

13. A container as specified in claim 11 wherein said sides are fabricated from dielectric material and wherein said antennas and said transmission line are printed on said material.

14. A container as specified in claim 13 wherein said material is plastic.

15. A container as specified in claim 13 wherein said material is fiberboard.

16. A container as specified in claim 11 wherein said conductive structure is an integral conductive structure printed on said container.

17. A container as specified in claim 16 wherein transmission line is integral with said antennas and carries said RFID signals from one of said antennas to another one of said antennas.

18. An integral conductive structure, comprising:
a first antenna for receiving RFID signals;
a second antenna; and
a transmission line configured to carry said RFID signals from said first antenna to said second antenna,
wherein said second antenna is configured to receive said RFID signals from said first antenna and is configured to radiate said RFID signals.

19. An integral conductive structure according to claim 18, wherein said transmission line is integral with said first and second antennas.

20. An integral conductive structure according to claim 18, wherein said transmission line is tuned to a frequency corresponding to the operating frequency of said RFID signals.

* * * * *